March 26, 1935.　　　L. F. KOERNER　　　1,995,355
THERMOSTAT COMPENSATOR
Filed April 28, 1933
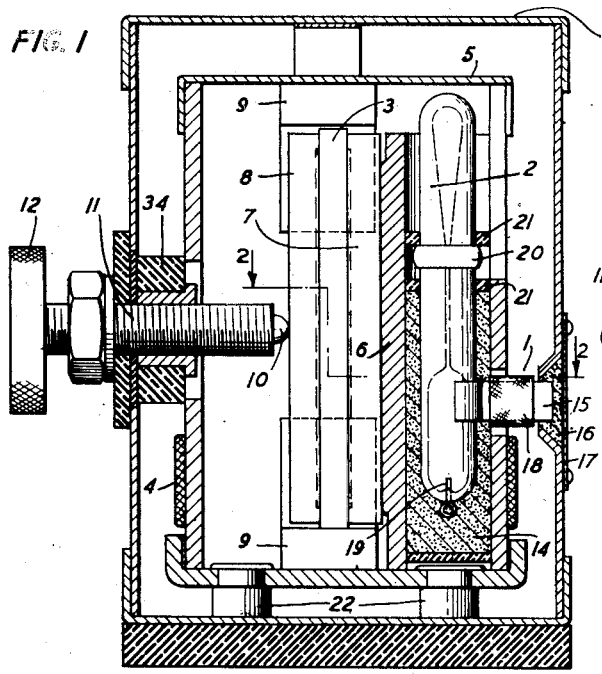
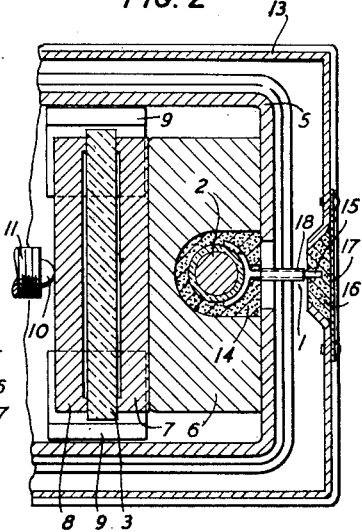
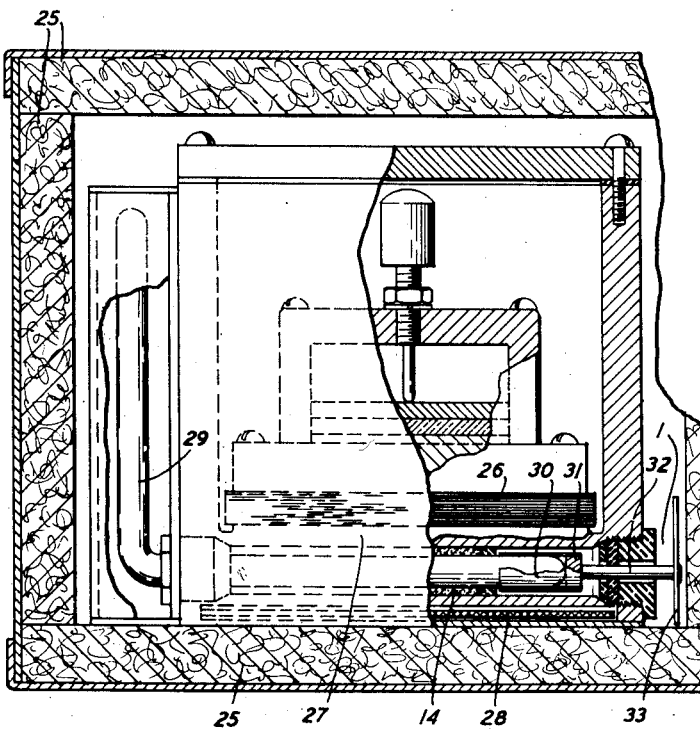
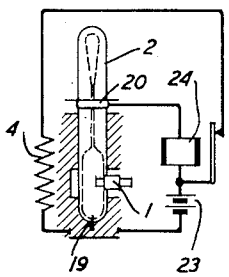
INVENTOR
L. F. KOERNER
BY Guy T. Morris
ATTORNEY Patented Mar. 26, 1935

1,995,355

UNITED STATES PATENT OFFICE 1,995,355

THERMOSTAT COMPENSATOR

Lawrence F. Koerner, Madison, N. J., assignor to Bell Telephone Laboratories, Incorporated, New York, N. Y., a corporation of New York Application April 28, 1933, Serial No. 668,375

6 Claims. (Cl. 236—1)

This invention relates to thermostat compensators, especially as applied in the temperature regulation in the interest of a stable natural frequency of a piezoelectric crystal or the like as affected by variations in temperature of the ambient atmosphere or other temperature variations of which the effect is superposed on that which conventionally governs the cyclic heating and cooling of the crystal, or the like, under the control of the thermostat.

In a typical temperature controlling operation, and well exemplifying the conditions which induce the use of the present invention, when the temperature of the element being controlled rises to a certain point by transfer of the heat from the heater supply, a contact on the thermostat closes a relay which disconnects the heater supply; as soon as the temperature in the thermostat falls the relay opens and heat is again supplied. The heated element and the thermostat (responsive element) are closely associated thermally so that the heated element is maintained at a temperature very nearly that at which the thermostat normally operates. That is, the temperature of the heated element tends to vary cyclically through a small range. In order to minimize this cyclical effect and therefore to more nearly insure that on-off operation of the thermostat transmits only its average effect to the heated element it is necessary to place the thermostat thermally some distance therefrom and separated from it by some means which has a heat filter action.

Two factors affect the temperature conditions at the heated element to the extent of determining the characteristics of this cyclical temperature variation. The first is the lag in the operation of the thermostat one component of which necessarily results from the use of the above filter means. It may be reduced to a considerable extent by refinement of details affecting the whole system and especially by ensuring as intimate a thermal association as possible between the thermostat and the heater supply.

The second factor which affects the temperature at the heated element is a change in the temperature of the ambient atmosphere, that is, the atmosphere surrounding the heated element. Of course, if there were perfect heat insulation the heated element could be isolated from the surrounding atmosphere and the temperature would be inherently stable without the necessary interposition of the heating and thermostatic control means. However, due to necessary limitations in size of the heated element, and other practical considerations, a perfect heat insulation may not be provided. Therefore, the heated element is partially thermally isolated from the surrounding atmosphere and maintained at a temperature above the temperature of such atmosphere through the operation of the heating and thermostatic control means as above. Since the filter means between the heated element and thermostat is not a perfect heat conductor, the heated element (crystal for example) is subject to temperature changes due to the imperfections of this heat insulation. At a lower ambient temperature the crystal will tend to cool due to a temperature gradient between the crystal and the outer container. At a higher temperature of the ambient atmosphere, the gradient is relatively less resulting in more heat being transmitted to the crystal and a consequent change of frequency.

The effect of the compensator is to allow a flow of heat from the thermostat to the outer wall of the crystal holder, cooling the thermostat and therefore necessitating the elapse of a greater time interval for it to assume its normal operating temperature. The longer this time the greater the amount of heat that is put into the crystal holder and therefore the heated element from the heating means. If the compensator is properly adjusted the heat loss at the crystal is reduced to zero by the compensatorially added heat introduced into the holder through the operation of the thermostat.

It is an object of the invention to compensate for the variations in temperature of the ambient atmosphere tending to induce the above effects.

It is another object of the invention to insure that the temperature of the controlled (heated) element is not affected, in its cyclic variation, by variations in temperature of the ambient atmosphere.

In one form of the invention the compensator has the form of a thermal conductor in close thermal relation with the thermostat and extending to the ambient atmosphere or other environmental space the fluctuations in the temperatures of which are to be compensated for, the area of cross-section of the conductor determining the efficiency of transfer and therefore the degree of compensation. In this form the conductor may therefore conveniently be attached to an outer metallic cover of the box or container for the element whose temperature is to be controlled. In another slightly variant form the conductor extends similarly from the thermostat but, instead of being attached to an element which partakes completely of the temperature conditions of the ambient atmosphere, it is connected to a radiating element, for example a metallic disc. The efficiency of the heat transfer is a function of the size of the radiating element rather than of the area of cross-section of the conductor as in the first form.

In the operation of either form of invention, there is an incidental small resultant change in the mean temperature of the heated element which, however, may of course be taken into account and permanently compensated for by proper electrical design of the thermostat. The compensators of the invention have been found to be so responsive to control of the heat transfer as to readily make possible an overcompensation, in fact, to make possible either desired direction of frequency change of a crystal whose temperature is being controlled, with either rising or decreasing ambient temperature.

Other aspects and features of the invention will be apparent from the following description when read in connection with the accompanying drawing in which:

Figs. 1 and 2 illustrate respectively an elevation and a plan, each partially in section, of one embodiment of the invention;

Fig. 3 is an elevation, partially in section, illustrating a slightly modified form of the invention otherwise illustrated by Figs. 1 and 2; and Fig. 4 illustrates the electrical circuit which is common to both forms of the invention, although the form illustrated specifically by Figs. 1 and 2 is that specifically shown in connection therewith.

In Figs. 1 and 2 the thermostat compensator, comprising the principal feature of the invention, is indicated generally by the reference numeral 1. Functionally associated with this compensator are: the thermostat 2, which is represented as of the mercury-in-glass type although the particular type is immaterial in the operation of the principle of the invention; the element the temperature of which is to be controlled, represented here by the piezoelectric crystal element, or the like, 3 (sometimes to be called the heated element); and the heating means 4, here represented as an electrical resistance thermally intimately associated with the crystal element 3 by being wound on the outer surface of the inner metallic container or "can" 5. The heat is transmitted from coil 4 to the heated element 3 through the walls of said container 5, the mass of heat conducting material 6 in which the thermostat is embedded, and thence by the electrode 7 to the crystal element. In this species there is no filter means between the thermostat and the heated element. If one were to be used it would be introduced between the electrode 7 and the mass 6, similarly as the filter 26 of Fig. 3 to be described later. The absence of the filter in this species does not affect the compensating action but does mean that the temperature of the heated element is not maintained quite as stable, because of the existence of a cyclical temperature effect, as, for example, the species illustrated by Fig. 3, which includes the filter. As a practical matter, the species of Figs. 1 and 2 has been used in aircraft work wherein there are greater tolerances of temperature change than in the environment in which the species of Fig. 3 is designed to be used, namely, radio broadcasting stations.

The crystal element 3 with its adjacent electrodes 7 and 8 on relatively opposite sides constitute a piezoelectric unit which, with all of its environmental structure, enables the crystal element to function, for example, as a frequency stabilizing element of an oscillator. Since the structure as a whole would ordinarily rest in the position indicated in Fig. 1, supports 9 are provided to fixedly secure the crystal element and prevent its displacement. The crystal element may be any one of the alternate forms now well known in the art, it especially being immaterial as to whether it is circularly or rectangularly cut. The elements 9 may well take the form of simple angles, their contours conforming to the particular position and shape of the elements secured thereby.

In order to further insure a structural stability and perhaps also to modify the action of the crystal element in a desired way, the crystal element may be clamped between its electrodes by the application of pressure from a bearing pin 10 which is spring pressed by a spring, not shown in the drawing, abutting on the inner surface of hollow screw threaded member 11. Adjustment of this screw threaded member, as by knurled portion 12, correspondingly adjusts the pressure on the crystal element. This pressure may be localized, as would normally be desirable, by insuring local, especially peripheral, contact between the crystal element and its electrodes as by means of raised rimlike portions of these electrodes, or perhaps of one of said electrodes. The screw 11 is inserted in bushing 34 which is secured to the inner can 5 and to the outer, similar, can 13.

The element 6 which contains the thermostat should be relatively massive in character to insure a comparatively stable temperature condition at the crystal element. To all intents and purposes it may be treated as the element the temperature of which is to be controlled since there is an intimate thermal association between the crystal element 3, the mass 6, and the thermostat 2 by reason of their contiguity and other design expedients. This thermal intimacy, respecting the relations between the mass 6 and the thermostat, is effected by the use of a substance 14, similar in character to a dental alloy, which surrounds the thermostat and which has approximately the heat conductive characteristics of the mass 6 itself. A substance like dental alloy has been found convenient as readily placed by packing in its normal state and thereafter hardens into substantially the form of a metallic solid substance. A plug closes one end of the opening in the mass 6 to retain the thermostat and its packing. The structure as so far described, especially as relates to thermostat and its immediately adjacent structure, is such as to permit ready assemblage.

The thermostat compensator provides a heat conduit, having critical characteristics, between the thermostat 2 and the ambient atmosphere, that is, the atmosphere outside the outer can 13. It is presumed that the temperature of the outer can approaches that of the ambient atmosphere and, in this form of compensator, attachment is made thereto as by soldering at point 15. To insure an ultimate smooth surface at the outer can the attachment is made at a depressed portion of the can, the depression being filled by a heat conducting, plastic, material 16 which may be the same kind of material as that of which the packing 14 is composed. Retaining member 17 may be screw fastened to the can to insure that the filling 16 will remain in place. Insulating sleeve 18 provides protection for the compensator where not necessarily exposed to thermal contact. The thermostat is provided with a lower contact 19 which is embedded in the glass wall thereof and in the packing material 14, and upper contact 20. Bakelite rings 21 separate the upper part of the packing material from the thermostat adjacent to this upper contact. The two cans may be secured to each other rigidly by rivets 22.

The compensation is a function of the effectiveness of heat transmittal between the heated element, which is controlled at a higher temperature than that of the ambient atmosphere, and the ambient atmosphere. It is therefore, more specifically, a function of the area of cross-section of the compensator and, to a lesser extent, of the area of contact between the thermostat and the forked end of the compensator where next adjacent thereto.

A form of electrical circuit adaptable to use with the structure of Figs. 1 and 2, as well as with the alternative structure of Fig. 3, is illustrated in Fig. 4, in which the corresponding elements are numbered similarly as in Figs. 1 and 2. Current for the heater winding 4 is derived from a battery or other direct current source 23, through the contacts of the relay indicated generally by 24. When the mercury in the thermostat wets the upper contact 20 a circuit is closed through the winding of the relay which opens the circuit through the heater. In this way the heating winding is cyclically opened and closed to cyclically regulate the temperature of the solid mass 6 at about the temperature corresponding to the upper thermostatic contact. The period of the cycle, and the amplitude of the cyclic temperature change, may be made quite small by having as intimate a temperature association between the three significant elements, namely, the heated element, the thermostat and the heating means, as is possible and by refinements in the relay circuit.

Because of the necessary deviations from perfection of the circuits and structures as disclosed, and which results in a cyclic variation of temperature instead of the ideal steady temperature state, it results that the cyclical phenomena, and therefore the temperature and natural frequency of the crystal element, tends to vary with variation in temperature of the ambient atmosphere to the extent that the two cans with the air insulation therebetween provides less than perfect heat insulation. The thermostat compensator effects a delayed or accelerated action of the thermostat as compared with conditions where the compensation is not required (steady state ambient temperature) and therefore a compensatory variation in the heating interval. For example, when the ambient temperature is falling, and therefore when the temperature of the heated element would tend to likewise fall, indicating the necessity of a greater cyclic interval of inflow of heat to the heated element to maintain it at a stable temperature, the thermostat, on account of the compensator, is cooled more rapidly than the heated element and more rapidly than would result merely from the increase in temperature gradient between the thermostat and ambient temperature on account of the fall of temperature of said ambient atmosphere, which eventually means that a greater interval of time is required before the mercury rises up to the upper contact and therefore that there is a greater interval of heating applied to the heated element through the coil 4. It has been found that by simple adjustments in the area of contact between the thermostat and the compensator or in the choice of cross-section of the compensator, or with both of these means in collaboration, any desired degree of compensation desired may be secured. In particular, the frequency of the crystal element may be caused to vary upwardly or downwardly at a desired rate with either an increase or a decrease of the ambient atmosphere, or the temperature, except for the small cyclical changes, can be kept constant through a relatively great variation of ambient temperature.

Fig. 3 illustrates a slightly different form of piezoelectric unit than that illustrated by Figs. 1 and 2, correspondingly requiring a slightly different type of thermostat compensator although operated in accordance with the same principle. The following description will emphasize only the essential differences over the priorly illustrated and described alternative, only those parts of element relating to these differences being labeled and specifically described.

Generally, the unit is designed for more accurate frequency control of the crystal element. The unit, therefore, would be better adapted for use in frequency control of broadcasting stations than for aircraft transmitters, the two units being, in practice, designed respectively with these two specific arts in view. Accordingly, the structure of Fig. 3 is somewhat more elaborated and also is of somewhat greater overall dimensions. Instead of employing an inner and outer can with air insulation therebetween as in Figs. 1 and 2 the outer can is lined with a layer of insulating material similar to celotex. This is indicated by reference numeral 25. The structure is normally disposed so that the crystal element is in a horizontal position, as shown, the support therefore not necessitating positioning elements like element 9 of Figs. 1 and 2. The clamping means may be the same. In order to reduce the cyclic effect, which tends necessarily to result from the inertia in the system which induces an undesired time lag in the reciprocal function of the thermostat, a thermal filter 26 is inserted between the mass 27, corresponding to mass 6 of Figs. 1 and 2, and the adjacent crystal element electrode. This filter may well take the form of alternate layers of conducting sheets and insulating fabric tightly pressed together and secured, by any convenient means, in the position indicated. It has been found desirable to substitute for the heating coil of Figs. 1 and 2 the flat heating element 28 which may be a resistance wire wound on a sheet of mica. For convenience in observation and also as comporting with the variations in structure as already described, as compared with the alternative structure of Figs. 1 and 2, the thermostat, here represented by reference numeral 29, is angled. The two contact elements, unlabeled, are shown in connection with the vertical portion, the lower contact being permanently in contact with the mercury and the upper contact functioning similarly as the upper contact 20 of Figs. 1 and 2. The lower portion of the thermostat is associated with the massive element 27 in much the same manner as with respect to the analogous elements in the alternative form. In a practical case in mind, graphite was used instead of dental alloy, to pack the thermostat within this mass.

The compensator differs considerably in form from that described in connection with the other figures although functioning quite similarly. Because of the necessity of associating it with the end of the thermostat instead of with its stem portion resort was had to the sliding type of connection shown. The compensator is terminated in a generally cylindrical section 30 which is crimped at intervals to provide a slight expansion when forced on to the end of the thermostat so as to tend to be tightly secured thereto. The heat transfer occurs from the thermostat to the cylindrical portion 30 and disc-like mass 31, thence through the tube or rod-like portion 32 to the radiating element 33. This radiating element, like the soldered connection to the other can of Figs. 1 and 2, provides the desired coupling with the ambient atmosphere. While, analogously with the alternative of Figs. 1 and 2, the radiator would be expected to be outside the outer can, instead of inside of it as shown, practically it would be difficult if so positioned to avoid an over-compensation. It is sufficient that the radiator be placed at a point which shares in the variation of temperature of the ambient atmosphere. With a structure like that disclosed there was found to be a sufficient natural frequency stability of the crystal, accountable for by adequate design of other associated structure than the thermostat itself, to make possible adequate compensation when the radiator is positioned as shown, that is, between the two cans. Its effect is a function of the size or superficial area of the radiator and to some extent of the distance between the radiator and the wall of the outer can. Under the usual conditions the radiator might well have the form of a disc attached to the heat conductor 32 at its center. Of course, where the radiator must necessarily have a larger diameter, practical considerations might require that the connection be relatively below the center of the disc if the radiator has this form. The particular form, with a given superficial area, is relatively unimportant.

What is claimed is:

1. In a temperature control system in combination, a solid heated element, heating means therefor, a temperature responsive element and means associated therewith which together are adapted to maintain the temperature of said heated element at a substantially constant value, said responsive element being unitarily connected to said solid heated element so as to provide as intimate a heat association therewith as possible, an element the temperature of which tends to vary, and means thermally associating said temperature responsive element with said variable temperature element to cause its temperature to vary as a function of the temperature of said variable temperature element to correspondingly vary the temperature responsive control of the heating means and therefore to compensate the control function for fluctuations of temperature of said variable temperature element.

2. The combination specified in claim 1 in which the means associated with the temperature responsive element comprises a heat conductor connecting said temperature responsive element with said variable temperature element and having an area of cross-section adequate to determine the rate of heating change appropriate to the degree of compensation desired.

3. The combination specified in claim 1 in which the means associated with the temperature responsive element comprises a heat conducting element connected to said temperature responsive element and terminated at the opposite end in a heat radiating or absorbing element and having a superficial area appropriate to the degree of compensation desired.

4. In a temperature control system in combination, an elastic vibratory element, a massive metallic supporting means therefor, a closure means for said vibratory element and supporting means, and means for fixedly securing said vibratory element on said supporting means, heating means and temperature responsive means both in intimate heat association with said supporting means and means associated therewith and adapted to control the temperature of said supporting means and hence the vibratory element at a substantially constant value, and a heat conducting means connecting said responsive means with the ambient atmosphere and so proportioned as to compensate the temperature responsive means for variations in temperature of the ambient atmosphere and hence enable the control organization to more nearly maintain the temperature of said vibratory element at a constant value.

5. The system of claim 4 in which the vibratory element is a piezoelectric crystal device and including further a second closure member for this vibratory element outside the recited closure member and having an insulating wall structure and an outside heat conducting layer, said compensating means being connected between said responsive means and said conducting layer and having a cross section adequate to achieve the compensating function.

6. The system of claim 4 in which the vibratory element is a piezoelectric crystal device and including further a second closure member for the vibratory element outside the recited closure member and having an insulating wall structure, said compensating means extending from said responsive means to a point between the two closure members and terminating in a heat radiating or absorbing element the extent of surface of which is adequate to achieve the compensating function.

LAWRENCE F. KOERNER.